(12) United States Patent
Lee

(10) Patent No.: US 6,851,327 B2
(45) Date of Patent: Feb. 8, 2005

(54) SHIFTING DEVICE FOR AN AUTOMATIC TRANSFER CASE

(75) Inventor: Tae-Hyung Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 41 days.

(21) Appl. No.: 10/299,874

(22) Filed: Nov. 18, 2002

(65) Prior Publication Data

US 2003/0100397 A1 May 29, 2003

(30) Foreign Application Priority Data

Nov. 28, 2001 (KR) .................................. 10-2001-0074537

(51) Int. Cl.⁷ .......................... F16H 59/00; F16H 37/02
(52) U.S. Cl. ............................ 74/335; 74/842; 475/210
(58) Field of Search .......................... 74/340, 352, 422, 74/842, 335, 339; 475/149, 209, 210, 212

(56) References Cited

U.S. PATENT DOCUMENTS

| 5,046,998 | A | | 9/1991 | Frost |
| 5,167,164 | A | * | 12/1992 | Maekawa et al. ........ 74/473.19 |
| 5,284,068 | A | | 2/1994 | Frost |
| 5,345,840 | A | | 9/1994 | Frost |
| 5,651,749 | A | | 7/1997 | Wilson et al. |
| 5,655,986 | A | | 8/1997 | Wilson et al. |
| 5,702,321 | A | | 12/1997 | Bakowski et al. |
| 5,704,867 | A | | 1/1998 | Bowen |
| 5,711,740 | A | * | 1/1998 | Bakowski ................... 475/303 |
| 5,720,688 | A | | 2/1998 | Wilson et al. |
| 5,832,777 | A | * | 11/1998 | Weilant ....................... 74/335 |
| 5,951,429 | A | | 9/1999 | Eastman |
| 6,001,041 | A | * | 12/1999 | Sawase et al. .............. 475/198 |
| 6,071,207 | A | | 6/2000 | Stephens et al. |
| 6,142,907 | A | * | 11/2000 | Minowa et al. ................ 477/5 |
| 6,152,848 | A | | 11/2000 | Williams et al. |
| 6,336,372 | B1 | * | 1/2002 | Ogami et al. ................. 74/335 |
| 6,367,342 | B1 | * | 4/2002 | Weismann et al. ............ 74/335 |

* cited by examiner

Primary Examiner—Roger Pang
(74) Attorney, Agent, or Firm—Morgan Lewis & Bockius LLP

(57) ABSTRACT

A shifting device of the automatic transfer includes a rack formed on a sleeve in the lengthwise direction of an output shaft, and a rotation torque supplying means is meshed to the rack, for linearly moving the sleeve over the output shaft. The response characteristics are improved when shifting from AUTO mode to LOW mode and vice versa, and the number of the involved components and the number of the assembling steps are decreased, thereby minimizing the manufacturing cost.

18 Claims, 4 Drawing Sheets

SHIFTING DEVICE FOR AN AUTOMATIC TRANSFER CASE

FIELD OF THE INVENTION

The present invention relates to a transfer case for a 4-wheel-drive power train, and more particularly, to a shifting device for an electronically controlled transfer case.

BACKGROUND OF THE INVENTION

A 4-wheel drive (4WD) vehicle exerts a driving force on all four wheels. Thus, the engine distributes power to both front and rear axles to maintain traction under all conditions. 4WD systems are classified as either part time or full time 4WD systems.

In a part time 4WD system, the vehicle operates in a 2-weel driving mode during normal conditions. However, upon encountering rough terrain or adverse weather conditions, a 4-wheel drive mode is engaged by using a 4WD transfer case to transfer a strong driving force or torque to all 4 wheels. In a full time 4WD system, all four wheels exert the driving force. Therefore, a full time 4WD system ensures stable traction both during normal conditions and adverse weather conditions, and therefore, many expensive vehicles come equipped with a 4WD transfer case.

Recently-built full time 4WD systems include an AUTO mode and a LOW mode. In the AUTO mode, the revolution differences between the front wheels and the rear wheels are electronically controlled by a multi-plate clutch, which engages the 2WD to 4WD, and vice versa. When maximum driving force or torque is required to maneuver the vehicle out of rough terrain or pull another vehicle, the system is shifted to the LOW mode.

Conventional transfer cases, however, have complicated mechanisms for shifting from the AUTO mode to the LOW mode and vice versa. Further, the number of the required components is large, and the manufacturing cost is high.

SUMMARY OF THE INVENTION

The present invention provides a shifting device for an automatic transfer case, in which the response characteristics are improved when shifting from an AUTO mode to a LOW mode and vice versa. The number of components required and the number of assembly steps are decreased, thereby curtailing the manufacturing cost.

In accordance with an embodiment of the present invention, a shifting device for an automatic transfer case comprises a rack formed on a sleeve in the longitudinal direction of an output shaft, and a rotation torque supplying means meshed to the rack, for linearly moving the sleeve on the output shaft.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE PREFERRED EMBODIMENT

Figure 1:
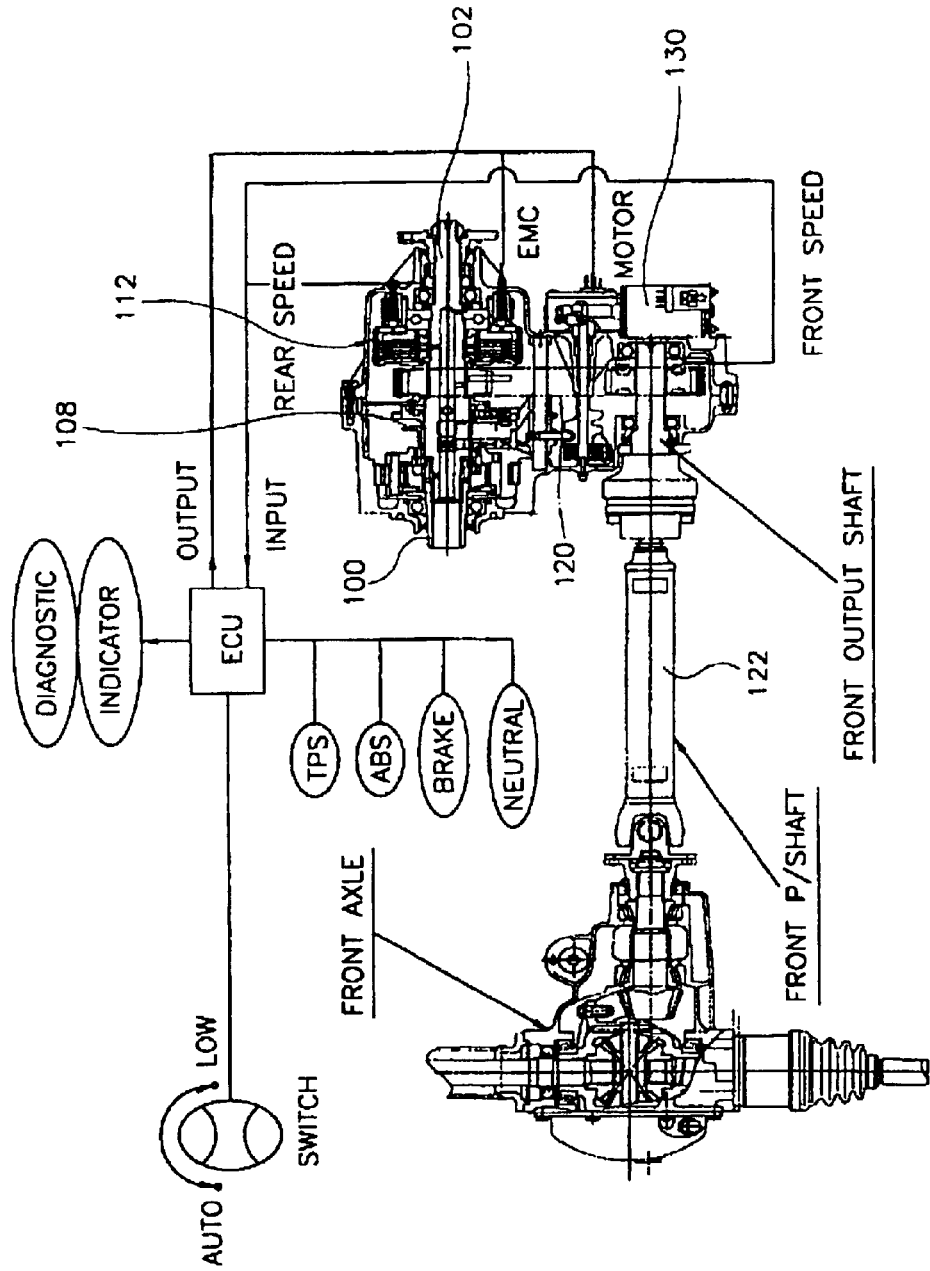
FIG. 1 illustrates a typical automatic transfer case.

The present invention will be described in detail referring to the attached drawings. Like components of the conventional automatic transfer case and the present invention will be assigned identical reference numerals and part names.

Figure 2:
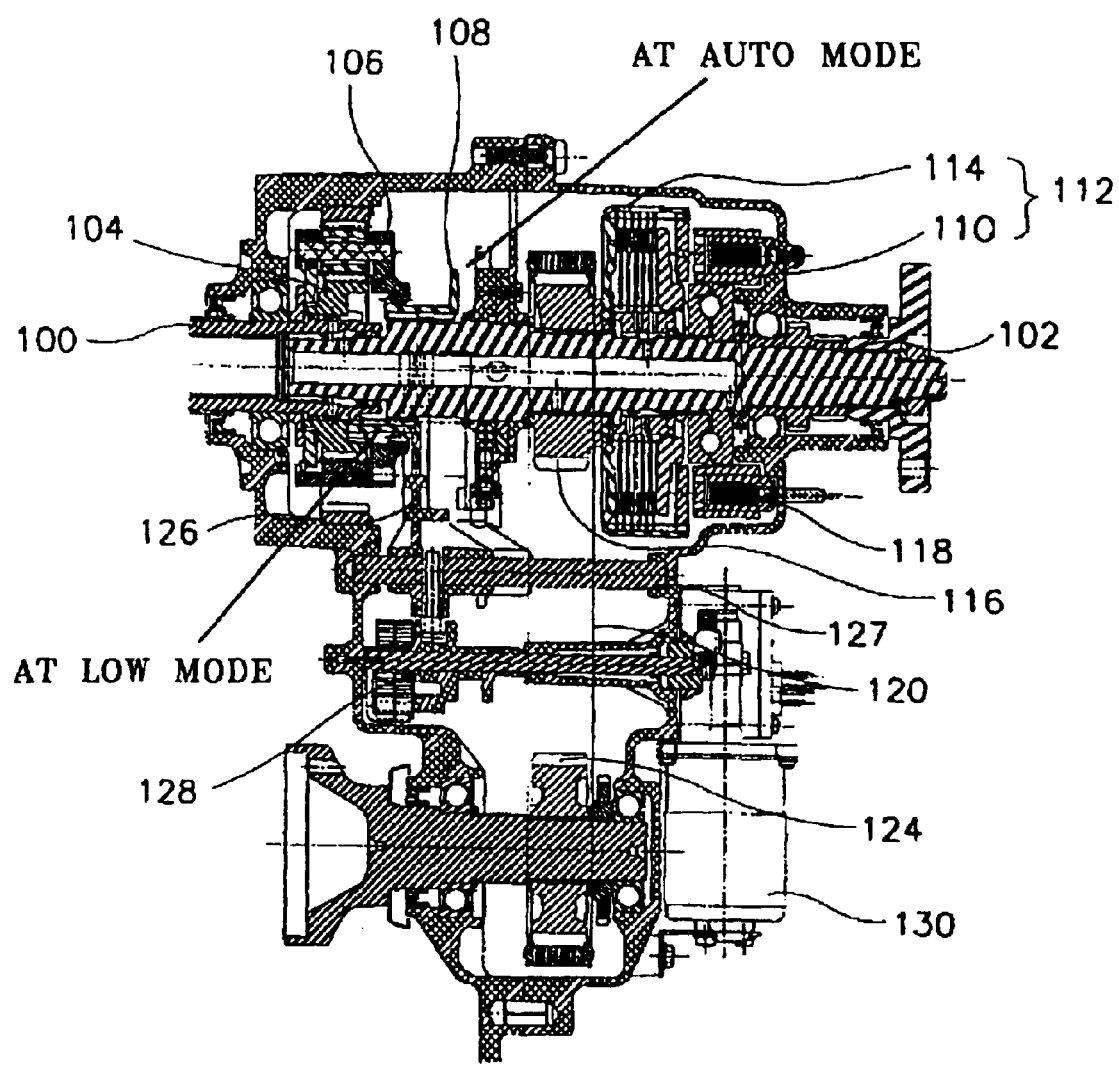
FIG. 2 illustrates in detail the typical automatic transfer case of FIG. 1.

FIGS. 1 and 2 illustrate a typical transmission used on electronically-controlled full time 4WD vehicles.

As shown in these drawings, the transfer case includes an input shaft 100 for receiving the power from a transmission, an output shaft 102 disposed coaxially with the input shaft 100, and connected to a rear driver shaft, a sun gear 104 installed on the input shaft 100, and a planetary carrier 106 meshed to the sun gear 104, a sleeve 108 for sliding on the output shaft 102 so as to shift from a direct connection status between the input/output shafts 100 and 102 to a direct connection status between the planetary carrier 106 and the output shaft 102, a slide manipulation device for making the sleeve 108 slide on the output shaft, a multi-plate clutch 112 with a hub 110 spline-coupled onto the output shaft 102, a driving sprocket 116 directly connected to a retainer 114 of the multi-plate clutch 112, an electronic coil 118 for activating the multi-plate clutch 112, and a driven sprocket 124 connected through a chain 120 to the driving sprocket 116, for transmitting the power to a front drive shaft 122.

The slide manipulation device includes a shift 126 connected to the sleeve 108, a shift rail 127 for guiding the shift fork 126, a shift cam for providing a moving force to the shift fork 126, and an electric motor 130 for supplying an actuation power to the shift cam 128.

In the above described transfer, the power which has been supplied to the input shaft 100 is supplied through the sleeve 108 to the output shaft 102 in the AUTO mode, so that the driving power can be transmitted to the rear drive shaft. At the same time, the front drive shaft 122 receives the power from the output shaft 102 through the multi-plate clutch 112 and the chain 120. Under this condition, the differences in revolution between the front wheels and the rear wheels are adjusted by the multi-plate clutch 112.

In the LOW mode, the sleeve 108 supplies the power of the input shaft 100 through the planetary carrier 106 to the output shaft 102, so that a low velocity driving force or torque can be transmitted to the output shaft 102 compared with the AUTO mode. The strong driving force or torque thus created is transmitted through the multi-plate clutch 112 to the front drive shaft 122.

Figure 3:
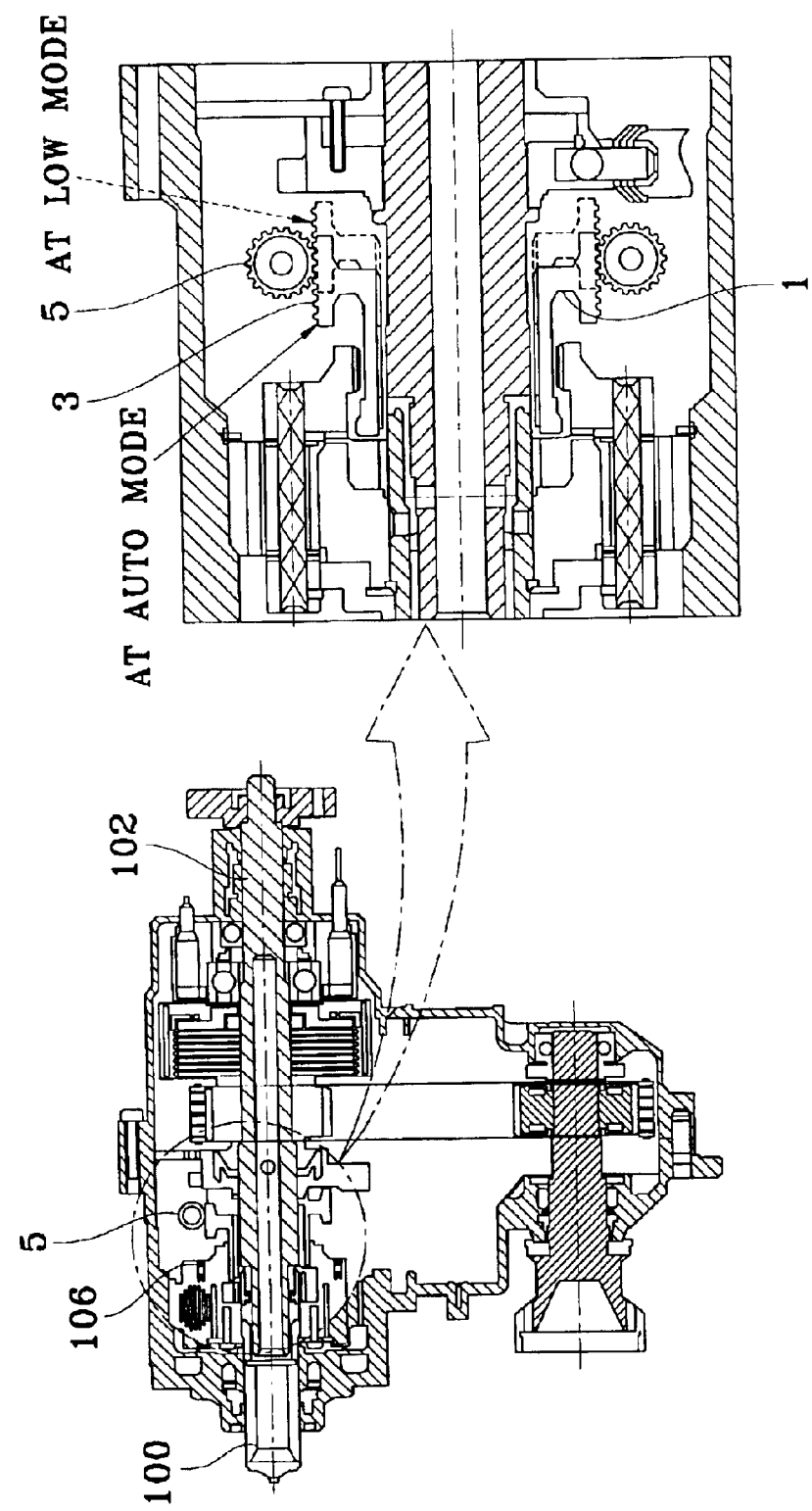
FIG. 3 illustrates an automatic transfer case of the present invention, in which the automatic transfer shifting device is embodied.
Figure 4:
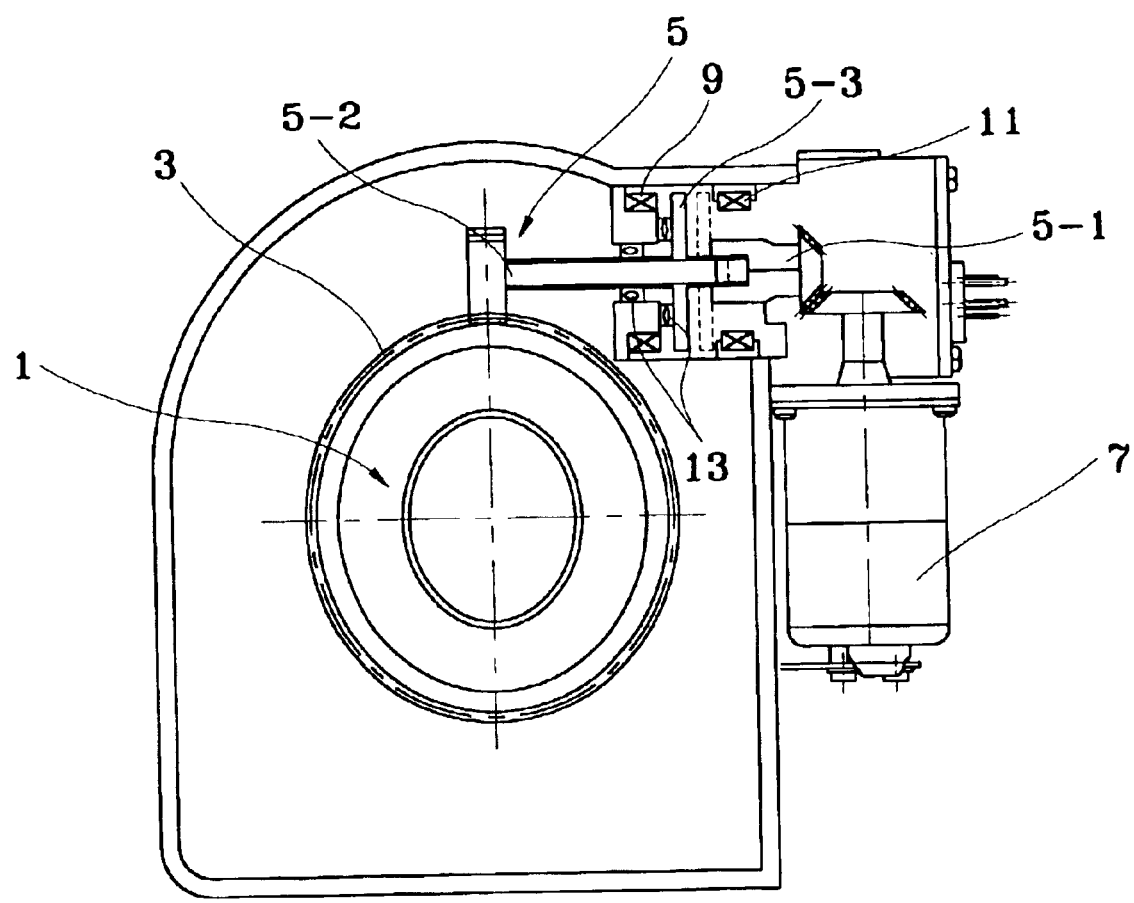
FIG. 4 is a side view of the shifting device of FIG. 3.

As shown in FIGS. 3 and 4, similar to the typical automatic transfer case, a sleeve 1 rotates together with an output shaft 102, and is preferably coupled to the output shaft 102 with splines so that the sleeve 1 is capable of linear movement along the axial or longitudinal direction of the output shaft 102. A rack 3 is formed parallel to the output shaft 102 by varying the shape of the portion where the conventional shift fork is connected. The rack 3 is preferably provided with a plurality of round teeth in one row, because the sleeve 1 is of a rotating cylindrical shape.

A rotation torque supplying mechanism is connected to the rack 3 and meshed to it, and therefore, the sleeve 1 can be linearly moved on the output shaft 102. The rotation torque supplying mechanism includes a driving gear 5 meshed through a plain gear to the rack 3, and a motor 7 for providing power to the driving gear 5. A clutch shifts the meshed status between the driving gear 5 and the rack 3, whereby the sleeve 1 of the rack 3 is linearly moved by the rotational force of the motor 7. The clutch ensures that the driving gear 5 and the rack 3 can be meshed together only during shifting. The meshed portion generates friction if the driving gear 5 and the rack 3 are to be maintained meshed together at other times. The clutch includes a rotation shaft set of the driving gear 5, comprising a driving shaft 5-1 and a driven shaft 5-2. The two shafts are spline-coupled in the axial direction. First and second electromagnets 9 and 11 selectively supply the magnetic forces to both sides of a flange 5-3 of the driven shaft 5-2, so as to make the driving shaft 5-1 linearly move in the axial direction relative to the driven shaft 5-2.

The first electromagnet 9 is installed within the transfer housing beside the flange 5-3 near the sleeve 1. The second electromagnet 11 is installed within the transfer housing near the motor 7; disposed so that it can pull the flange 5-3 by means of the electrically energized magnetic forces. Further, within the transfer housing to the side of the sleeve 1, bearings 13 are disposed at a position where the flange 5-3 and the driven shaft 5-2 make contact.

Shifting from an AUTO mode to a LOW mode and vice versa should be undertaken after the vehicle has come to a complete stop. In the case of a vehicle with a manual transmission, the mode shifting must be performed with the clutch pedal pressed down, while for an automatic transmission, the shift lever must first be placed into neutral (N) before mode shifting can be carried out.

If the driver carries out the mode shifting when the vehicle is parked and the power is not supplied to the input shaft 100, then the driving power of the motor 7 is transmitted through the driving gear 5 to the rack 3 of the sleeve 1. Accordingly, the sleeve 1 moves longitudinally along the output shaft 102, so that the direct connection between the input shaft 100 and the output shaft 102 is shifted from, or to, the connection of the input shaft 100 through the planetary carrier 106 to the output shaft 102. That is, if the driver switches from an AUTO mode to a LOW mode or vice versa, the electric power is supplied to the first electromagnet 9, and therefore, the driven shaft 5-2 of the driving gear moves left (in FIG. 4) toward the rack 3 due to the moving of the flange 5-3 toward the first electromagnet, so that the gear portion is meshed to the rack 3 of the sleeve. Then the motor 7 is activated to drive the driving gear 5, and therefore, the sleeve 1 moves right (in FIG. 3), so that the input shaft 100 is connected through the planetary carrier 106 to the output shaft 102.

After the shifting actuation is completed, the power is supplied to the second electromagnet 11, and therefore, the driven shaft 5-2 moves toward the motor 7, so that the direct mesh between the driven shaft 5-2 and the rack 3 is released, thereby preventing friction between the rack 3 and the driving gear 5 while the vehicle is in motion.

If the driver shifts from a LOW mode to an AUTO mode, then the electric power is supplied to the first electromagnet 9. Consequently, the driven shaft 5-2 of the driving gear moves left (in FIG. 4) to mesh the driving gear 5 with the rack 3 of the sleeve. Then, since the motor 7 rotates in the reverse direction, the sleeve 1 moves leftward, so that the input shaft 100 and the output shaft 102 are directly meshed together. Thereafter, power is supplied to the second electromagnet 11, and the driving gear 5 moves away from the rack 3 of the sleeve.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A shifting device for an automatic transfer case, comprising:
    a rack integrally formed to a sleeve in a longitudinal direction of an output shaft;
    rotation torque supplying mechanism meshed to the rack, for linearly moving the sleeve on the output shaft;
    said rotation supplying mechanism comprises:
    a driving gear meshed to the rack;
    a motor for providing power to the driving gear;
    and a clutch for shifting a meshed status between the driving gear and the rack.

2. The shifting device as claimed in claim 1, wherein the clutch comprises:
    a rotation shaft set of the driving gear, consisting of a driving shaft and a driven shaft, the two shafts being spline-coupled in the axial direction; and
    first and second electromagnets for selectively supplying magnetic forces to both sides of a flange of the driven shaft, so as to make the driving shaft linearly move in an axial direction relative to the driven shaft.

3. A shifting device for a transfer case, comprising:
    an output shaft rotatable about a longitudinal axis;
    a sleeve coupled to said output shaft in a manner that allows it to rotate with said output shaft about said longitudinal axis and slide along a path parallel to said longitudinal axis;
    a rack integrally formed to said sleeve;
    a driving gear configured to releasably engage with said rack; and
    a motor coupled to said driving gear and configured to rotate said driving gear, when engaged with said rack, to move said sleeve along said path.

4. The shifting device of claim 3, further comprising an input shaft releasably coupled to said output shaft via said sleeve.

5. The shifting device of claim 3, further comprising an input shaft releasably coupled to said output shaft via a planetary gear and said sleeve.

6. The shifting device of claim 3, wherein said sleeve is spline-coupled to said output shaft.

7. The shifting device of claim 3, wherein said output shaft is coupled to a rear drive shaft.

8. The shifting device of claim 3, wherein said output shaft is coupled to a front drive shaft through a clutch.

9. The shifting device of claim 3, wherein said rack includes teeth that intermesh with teeth on said driving gear.

10. The shifting device of claim 3, further comprising a driven shaft coupled between said driving gear and said motor.

11. The shifting device of claim 10, wherein said driven shaft is supported by bearings coupled to a housing.

12. The shifting device of claim 10, further comprising a driving shaft coupled between said driving gear and said driven-shaft.

13. The shifting device of claim 12, wherein said driven shaft is spline coupled to said driving shaft which is rotatably coupled to said motor.

14. The shifting device of claim 3, further comprising at least one electromagnet configured to releasably engage said driving gear with said rack.

15. The shifting device of claim 3, further comprising a clutch for releasably engaging said driving gear to said rack.

16. The shifting device of claim 15, wherein said clutch comprises:
   a driven shaft rotatable about an axis and coupled to said driving gear;
   a flange coupled to said driven shaft;
   a driving shaft coupled to said driven shaft, such that said driven shaft can rotate with said output shaft about said axis and slide along a path parallel to said axis; and
   at least one electromagnet for selectively attracting and repelling said flange to engage and disengage said driving gear and said rack with one another.

17. A transfer case, comprising:
   an input shaft adapted to be coupled to a transmission;
   an output shaft rotatable about a first longitudinal axis;
   a sleeve coupled to said output shaft in a manner that allows it to rotate with said output shaft about said first longitudinal axis and slide along a path parallel to said longitudinal axis, where said sleeve is configured to releasably couple with said input shaft;
   a rack integrally formed to said sleeve;
   a driving gear configured to releasably engage with said rack;
   a motor coupled to said driving gear and configured to rotate said driving gear, when engaged with said rack, to move said sleeve along said path;
   a driven shaft coupled to said driving gear and rotatable about a second longitudinal axis that is substantially perpendicular to said first longitudinal axis;
   a flange coupled to said driven shaft;
   a driving shaft coupled to said driven shaft, such that said driven shaft can rotate with said output shaft about said axis and slide along a path parallel to said second longitudinal axis; and
   at least one electromagnet for selectively attracting and repelling said flange to engage and disengage said driving gear and said rack with one another.

18. A shifting device for an automatic transfer case, comprising:
   a rack coupled to a sleeve in a longitudinal direction of an output shaft;
   rotation torque supplying mechanism meshed to the rack, said rotation torque supplying mechanism configured to linearly move the sleeve on the output shaft, wherein the rotation torque supplying mechanism comprises:
      a driving gear meshed to the rack;
      a motor for providing power to the driving gear; and
      a clutch for shifting a meshed status between the driving gear and the rack, wherein the clutch comprises:
         a rotation shaft set of the driving gear, consisting of a driving shaft and a driven shaft, the two shafts being spline-coupled in the axial direction; and
         first and second electromagnets for selectively supplying magnetic forces to both sides of a flange of the driven shaft, so as to make the driving shaft linearly move in an axial direction relative to the driven shaft.

* * * * *